Feb. 6, 1973 S. F. IACOBELLIS 3,714,785
ROCKET ENGINE NOZZLE WITH GAS SPIKE
Filed Feb. 11, 1966
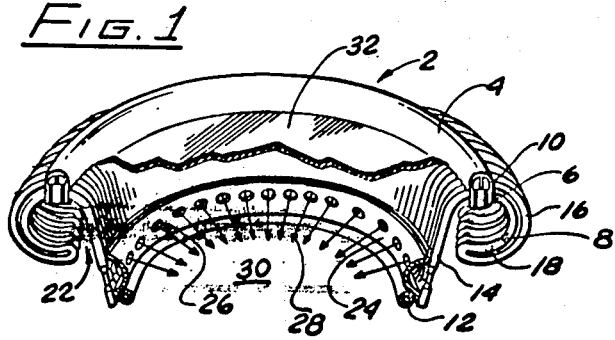
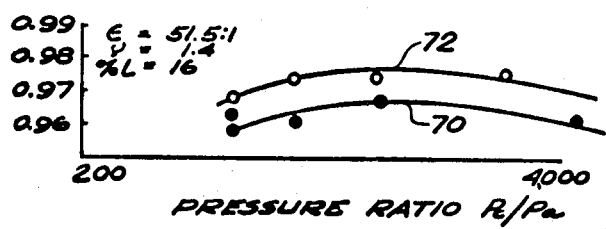
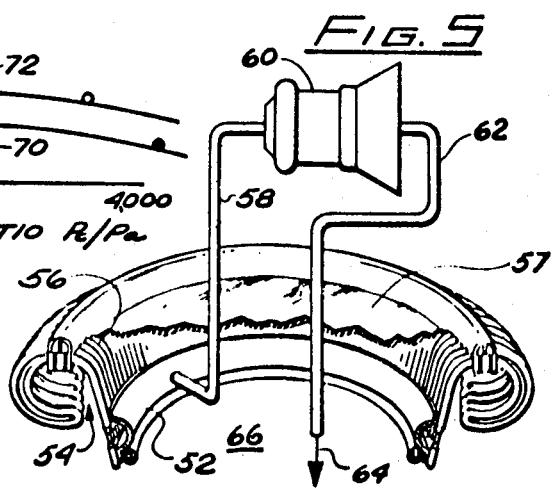
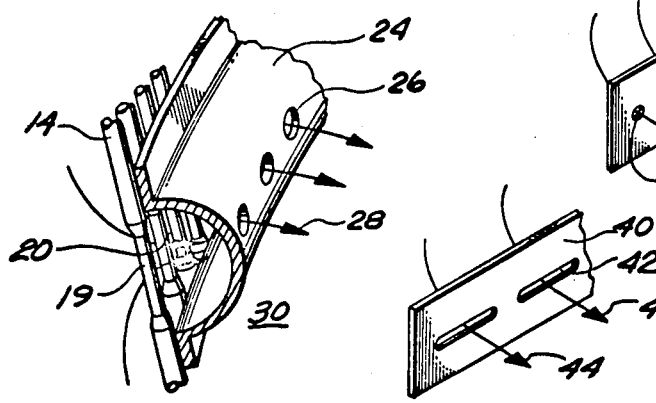
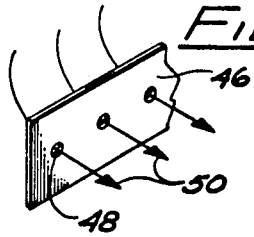

United States Patent Office 3,714,785
Patented Feb. 6, 1973

3,714,785
ROCKET ENGINE NOZZLE WITH GAS SPIKE
Sam F. Iacobellis, Woodland Hills, Calif., assignor to
North American Rockwell Corporation
Filed Feb. 11, 1966, Ser. No. 526,913
Int. Cl. F02k 9/02
U.S. Cl. 60—258                                                                  6 Claims This invention relates to gas generating devices.

More particularly, this invention relates to a gas generating device such as a rocket engine or the like in which nozzle efficiency is increased.

The typical rocket engine known in the art comprises an axially aligned injector, combustion chamber, throat and nozzle. This is the well-known bell or de Laval nozzle.

Developments in recent years have included the use of a different type of nozzle having an annular thrust chamber and a "spike" which is shaped like a cone and forms the nozzle portion. An example of thise can be seen in British Pat. No. 885,489 of Dec. 28, 1961. In this type of engine, combustion chamber gases are directed somewhat inwardly of the engine axis and impinge on the spike to provide thrust.

The difficulty of the spike nozzle resides in the necessity for a relatively long spike nozzle which requires a massive structure adding to the length and weight of the engine. Another difficulty resides in cooling the spike portion.

One approach to obviate the disadvantages of the spike nozzle and yet obtain the advantages thereof is disclosed in U.S. patent application Ser. No. 349,781, filed on Mar. 5, 1964, now Pat. No. 3,270,501, granted Sept. 6, 1966. In the aforementioned patent application, the solid spike nozzle portion is not used. Instead, gas is fed through the interior portion of the engine either from the combustion chamber or the exhaust from turbopumps so as to increase base pressure on the engine. Base pressure is defined as pressure exerted by gas on the region of the engine enclosed by the annular combustion chamber.

This invention constitutes a still further advance in the art in that separate gas generating means or complicated tubing is eliminated and yet still provides the capability of increasing base pressure. This obviates the disadvantages of the aerodynamic spike nozzle described in the aforementioned patent application.

Ordinarily in the spike nozzle type engine, gases impinging on the spike provide additional thrust. If the spike is removed, low pressure will result on the truncated base area of the nozzle due to the flow of primary gases produced in the combustion chamber. This low base pressure is undesirable because it reduces the thrust and efficiency is effected. It is, therefore, desirable to increase base pressure on the engine. In the aforementioned patent application the base presure is increased by either exhaust flow from a turbopump or a bleed-off from the combustion chamber itself into the base region.

This invention is an improvement in that an annular combustion chamber is provided with the gases passing out through the throat with a nozzle bleed-off provided downstream of the throat to supply the flow to the base region to increase the base pressure which, in turn, increases the thrust and efficiency of the engine.

The objects and advantages of this invention will become apparent as this description proceeds taken in conjunction with the drawings in which:

FIG. 1 is a cutaway view of a portion of a gas generating device constructed according to one embodiment of this invention.

FIG. 2 is a view partially in cross-section of the bleed-off portion of the engine constructed according to FIG. 1, FIG. 3 is a view of a portion of another embodiment of a gas bleed-off, FIG. 4 is a view of a portion of still another embodiment of a gas bleed-off.

FIG. 5 is a view similar to that of FIG. 1 showing the gas bleed-off being utilized to drive a turbine, with the turbine exhaust acting as the secondary flow, and FIG. 6 is a graph of nozzle efficiency versus pressure ratio of an engine without base bleed as compared with an engine constructed according to this invention.

Referring to FIG. 1, a rocket engine designated generally at 2 is shown. This engine is similar in some respects to that disclosed in the aforementioned patent application. A manifold 4 is provided for distributing propellant to injector 6 which injects the propellant into combustion chamber 8. This manifold may have a partition 10 where bi-propellants are used. For purposes of clarity, the propellant source is not shown but may comprise propellant lines leading to manifold 4 from tanks, pumps or the like.

Another manifold 12 receives propellant from a source not shown and passes these propellants through tubes 14 into either manifold 4 or directly into injector 6. By passing propellant through tubes 14, a portion of the nozzle wall is cooled. Tubes 14, when assembled adjacent other tubes, from the nozzle wall.

Propellant flows from manifold 4 through tubes 16, reversing direction to pass through tubes 18 and into injector 6.

Tubes 14 have narrowed portions 19 as more clearly brought out in FIG. 2 so that openings 20 are formed therebetween to allow for passage of a portion of the combustion gases exiting from combustion chamber 8 and throat 22. These gases are collected in manifold 24 and passed through openings 26 as shown by arrows 28. By bleeding off the gases into the center body 30, the pressure exerted against base region 32 is increased thus adding to the thrust of the engine. This pressure is termed "secondary pressure" or "base pressure."

FIG. 3 illustrates another embodiment of the invention wherein the tubes 14 of FIG. 1 of the nozzle portion are replaced by a wall 40 having slots 42 for bleeding of the primary gas flow through slots 42 as indicated by arrows 44. In other respects, the operation of this embodiment is similar to that of FIG. 1. In this embodiment, no manifold 24 is necessary.

FIG. 4 is similar to that of FIG. 3 except that wall 46 has apertures 48 for the passage of gas in the direction of arrows 50.

FIG. 5 is another embodiment similar to that of FIG. 1 in that manifold 52 receives gases passing through throat 54 entering by way of apertures or openings between tubes 56. The gas bled between tubes 56 into manifold 52 pass through conduit 58 into turbine 60. This gas is at a high enough pressure to run turbine 60 which can be used to power a pump for propellant delivery or other uses. The exhaust from turbine 60 then passes into conduit 62 exiting in the direction of arrow 64 to provide the secondary pressure against base 57 in center body 66 in much the same manner as that of FIG. 1.

FIG. 6 is illustrative of the increase in nozzle efficiency versus the combustion chamber pressure/ambient pressure ($Pc/Pa$). Line 70 is the curve from an engine similar to FIG. 1 without openings for bleeding gas from the primary flow into the center body while curve 72 is illustrative for the engine of FIG. 1 with secondary flow into the center body in the manner shown. Thus it can be seen that nozzle efficiency is increased with a portion of the primary flow exiting through the nozzle downstream of the throat region into the center body region.

Several advantages of the instant device over that of the aforementioned patent application occur. There is, for example, no necessity for providing a tap off from the combustion chamber with resultant hot spot formation due to the high temperature of combustion chamber gases. Thus, less cooling problems will exist. Furthermore, gases which are tapped off from the main combustion chamber must be of a mixture ratio unlike the main combustants. Otherwise, the temperature of the tapped off gases would be excessive for its purpose as well as its transport ducts and manifolds. Hence, the main combustor operates at an off mixture ratio and resultant loss in efficiency to compensate for the fuel or oxidizer gases which were tapped off. Also, separate secondary gas sources are not needed unlike in the device of the aforementioned patent application. Thus, the instant engine can be used with solid propellants or pressure fed liquid engines using propellants pressurized by stored gas.

Having described this invention, it is to be understood that it is to be limited only by the scope of the claims appended hereto.

I claim:

1. In a rocket engine having an annular combustion chamber, an injector and an annular throat, that improvement which comprises;
   an annular nozzle portion, said nozzle portion extending downstream from said throat adjacent the interior portion thereof and converging toward the interior of said rocket engine, said nozzle portion having openings therein,
   whereby gases exiting from said throat will impinge on said nozzle portion with a portion of said gases passing through said openings to the interior of said nozzle portion to increase base pressure on said engine.

2. In a rocket engine according to claim 1 wherein said openings are slots.

3. In a rocket engine according to claim 1 wherein said nozzle is constructed of tubes, said openings being formed between said tubes.

4. In a rocket engine accordng to claim 1 wherein a manifold is provided on the interior of said nozzle adjacent said openings to collect said gases.

5. In a rocket engine according to claim 4 wherein said manifold has openings to allow passage of gases into said nozzle interior.

6. In a rocket engine according to claim 4 and further including means to transfer said gases from said manifold to a turbine, said turbine being adapted to exhaust gas into said nozzle interior.

References Cited

UNITED STATES PATENTS

| | | | |
|---|---|---|---|
| 3,012,400 | 12/1961 | Corson, Jr. | 239—265.11 |
| 3,086,357 | 4/1963 | Rubin et al. | 137—15.2 |
| 3,093,963 | 6/1963 | York, Jr., et al. | 60—260 |
| 3,127,738 | 4/1964 | Hasbrouck et al. | 137—334 |
| 3,259,065 | 7/1966 | Ross et al. | 244—3.1 |
| 3,270,501 | 9/1966 | Webb | 60—259 |

SAMUEL FEINBERG, Primary Examiner

U.S. Cl. X.R.

60—264, 39.16; 137—265.11, 265.17